July 7, 1970   P. A. MÜLLER   3,518,921
METHOD AND APPARATUS FOR PRODUCING A TOBACCO FILTER
ROD OR CORD FROM A WEB OF FIBROUS MATERIAL
Original Filed Jan. 22, 1957   3 Sheets-Sheet 1
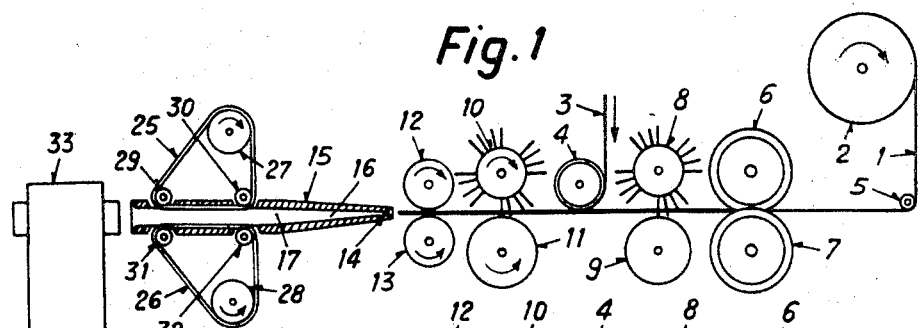
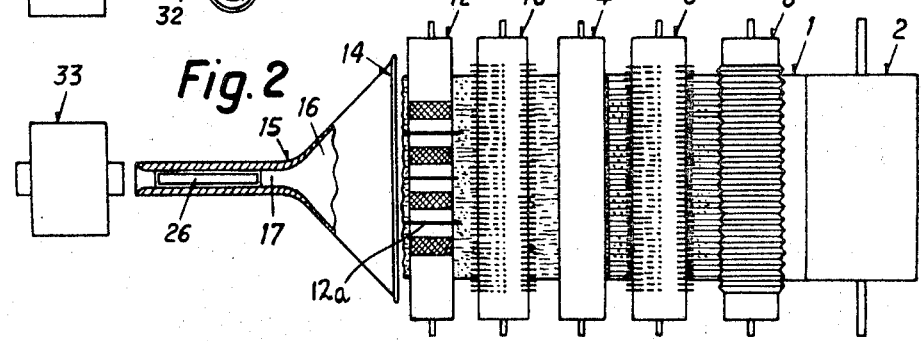
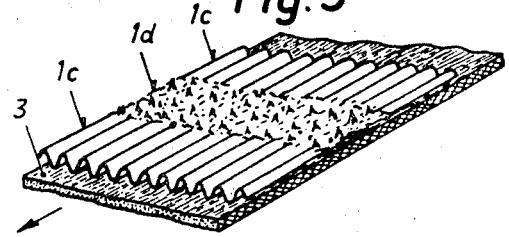
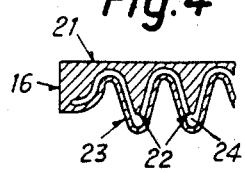
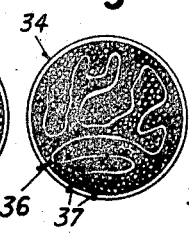
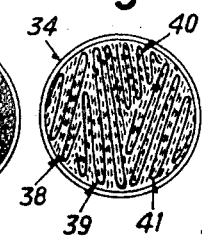
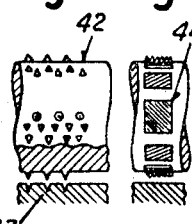
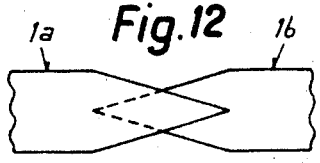
INVENTOR.
PAUL ADOLF MÜLLER
BY
ATTORNEYS July 7, 1970 P. A. MÜLLER 3,518,921
METHOD AND APPARATUS FOR PRODUCING A TOBACCO FILTER
ROD OR CORD FROM A WEB OF FIBROUS MATERIAL
Original Filed Jan. 22, 1957 3 Sheets-Sheet 2

INVENTOR
PAUL A. MULLER

BY
*Cushman, Darby & Cushman*
ATTORNEYS

United States Patent Office 3,518,921
Patented July 7, 1970

3,518,921
METHOD AND APPARATUS FOR PRODUCING A TOBACCO FILTER ROD OR CORD FROM A WEB OF FIBROUS MATERIAL
Paul A. Müller, Triesenberg, Liechtenstein, assignor to Celfil Company Establishment, Vaduz, Liechtenstein, a corporation of Liechtenstein
Original application Sept. 1, 1959, Ser. No. 841,918, now Patent No. 635,470, dated Jan. 22, 1957. Divided and this application Feb. 8, 1967, Ser. No. 614,595
Claims priority, application Switzerland, Aug. 4, 1953, 95,066/53; Feb. 15, 1955, 16,102/55; Jan. 25, 1956, 291,188/56
Int. Cl. B31d
U.S. Cl. 93—1  9 Claims

ABSTRACT OF THE DISCLOSURE

Method and apparatus for treating an elongated sheet of fibrous material, e.g. paper, to render it especially suitable to be made into plural sectional filters for cigarettes. The material, while being continuously advanced, is first moistened, then passed through the nip between a pair of intermeshing heated rolls which form closely-spaced longitudinal corrugations in the sheet and simultaneously laterally stretch it to loosen and expose its fibers. The sheet then is mechanically treated, e.g. as by perforating it to form ragged openings, to alter its filtering characteristics in different ways in successive transverse zones.

---

This application is a division of my copending application Ser. No. 841,918, filed Sept. 1, 1959, which was a division of my co-pending application Ser. No. 635,470, filed Jan. 22, 1957 (now Pat. No. 2,916,039, granted Dec. 8, 1959), which was a continuation-in-part of my co-pending application Ser. No. 502,016, filed Apr. 18, 1955 (now Pat. No. 2,995,481, granted Aug. 8, 1961), which was a continuation-in-part of my earlier application Ser. No. 447,086, filed Aug. 3, 1954 (now Pat. No. 2,847,086, granted Aug. 12, 1958). Said application Ser. No. 841,918 also was a continuation-in-part of my application Ser. No. 504,647, filed Apr. 28, 1955 (now Pat. No. 3,161,557, granted Dec. 15, 1964).

The present invention relates to a filter cord for the production of filter plugs for cigarettes, cigars, etc., and in particular for the production of so-called multi-layer filters having filter sections of different properties following one another in the smoke's direction of flow.

Such double or multiple layer filters are already known and are as a rule used when the actual filtering material—for instance cotton wool or else powdery substances such as activated carbon—is unsuitable for forming the end of the filter mouthpiece. In such cases the free end of the filter plug is formed by a porous member which is readily permeable to smoke, little absorbent and abuts inwardly against a filter section forming the absorbent filtering body. As successive filter sections consist here of different materials, the mechanical manufacture of such multi-layer filter plugs naturally involves considerable difficulty and calls for complicated equipment.

The present invention aims at eliminating these difficulties in the production of such filter plugs and relates to a method of producing a filter cord capable of being worked into multi-layer filter plugs for tobacco goods, particularly cigarettes, which cord has filter sections of different properties following each other in the smoke's direction of flow, characterized by the fact that the filter cord is produced from an at least single-layer, virtually endless, uniform web of material which can be folded in a transverse direction and has its material structure altered differently in successive transverse zones, whereupon the web of material is gathered together in a transverse direction to form an endless cord with sections of different structure following each other in the longitudinal direction.

The arrangement according to the invention for producing such a filter cord is characterized by a device, through which the strip of material continuously passes and which is designed to achieve structural alterations in narrow zones transverse to the web's direction of travel so that altered and unaltered transverse zones follow one another, and further characterized by means designed subsequently to gather said web of material into an approximately round filter cord.

A filter cord produced in accordance with this method is characterized by at least one web of material which is gathered together in a transverse direction and has transverse zones of different structure.

It should be pointed out that the multi-layer filter cord according to the invention consists of a plurality of cord sections which follow each other in the direction of flow and of which adjacent sections have in each case a different structure. Furthermore, the filter cord may, of course, also be produced from one or several superposed webs of material by gathering same transversely to the longitudinal direction of the web and thus has in every cross-sectional plane a plurality of layers arranged above and beside one another.

A few typical embodiments of the invention will, by way of example, now be described in detail in conjunction with FIGURES 1 to 18 of the attached drawing in which:

FIGS. 1 and 2 are an upright and a horizontal projection respectively, both drawn partly in section, of a typical embodiment for an arrangement according to the invention, shown in diagrammatic reproduction;

FIG. 3 is a perspective representation of a filter web according to the invention;

FIG. 4 is a folding aid shown in cross-section;

FIGS. 5, 6 and 7 are each cross-sections through examples of a filter cord which can be produced with the arrangement according to the invention, shown in diagrammatic reproduction;

FIGS. 8, 9, 10A, 10B, 10C and 10D, are each upright projections and sections through various embodiments of deforming rollers;

FIGS. 11 and 12 are each diagrammatic reproductions of two overlapping webs of material;

Figure 10:
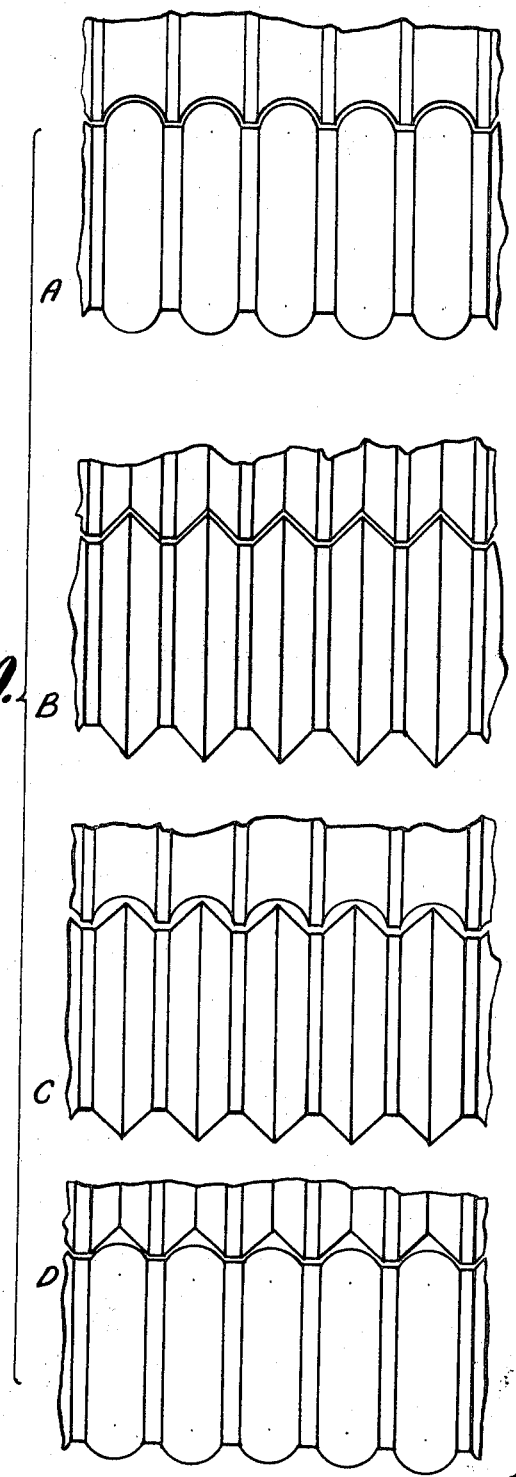

The arrangement illustrated in FIGS. 1 and 2 is, by way of example, intended for the production of an endless double filter cord from a two-layer web of material. One web of material 1, forming the carrier, is unwound from the magazine roll 2 and passes through all the deforming means provided, while the second web of material 3, forming a fiber coating, is not applied to the carrier web 1 via the laying roller 4 until the structure of said carrier web has already been altered.

The web of material 1 consists here, by way of example, of an absorbent paper web of given width which passes from the magazine roll 2 via the guide pulley 5 to the pair of rollers 6, 7 which represent in this case the first deforming means. Said two rollers 6 and 7 have a plurality of interlocking stamping edges which extend annularly along their circumference and are so designed that the paper web 1 is provided with a corresponding number of longitudinal grooves, although the width of the web is at least approximately preserved. This, of course, can only be achieved by simultaneously stretching the paper web 1 in a transverse direction, i.e., in the direction of the rollers' axes. Such a stretching of the material results in a desirable structural alteration of the latter, in that the paper fibers are pulled apart and, if the depth of the grooves is adequate, unconnected longitudinal cracks appear in the web. Such crimping of the paper web in the longitudinal direction substantially increases the absorptive power of the paper, which is of advantage for the present purpose. The axial distance and the radial dimensions of the stamping grooves as well as their contours can, of course, be selected as desired in order to obtain a finer or coarser, or else a shallower or deeper longitudinal crimping of the paper web. Such a longitudinally crimped paper web can be easily gathered together transversely to the direction of travel to form an endless cord.

The rollers 6 and 7 are completely uniformly provided with stamping grooves of the type described along their effective axial extension. It is, of course, also possible to provide only certain annular zones of the roller surface with such stamping grooves so that a paper web is produced which has longitudinally crimped and non-crimped strips side by side.

The paper web 1, which in the embodiment according to FIGS. 1 and 2 is longitudinally crimped over its entire width, then passes to a pair of rollers 8 and 9, comprising a toothed roller 8 and a counter roller 9 provided with corresponding depressions, which pair of rollers serve to perforate the paper web 1. In this case only certain sectors of the roller's circumference are provided with perforating teeth along the entire axial extension of the roller 8 so that individual parallel transverse zones of the longitudinally crimped material web 1 are perforated on each occasion; that is to say, perforated and non-perforated transverse zones follow each other in the direction of travel. If desired, the two rollers 8, 9 can, of course, also be used simultaneously as toothed roller and counter roller so that some of the perforations are made from above and others from below. The perforating rollers 8 or 9 are preferably so designed that material is not punched out of the paper web, but only dislodged and the edges of the individual perforation holes are frayed, which increases the filtering effect of such a paper web in the perforated sections.

The paper web 1, which is longitudinally crimped in a uniform manner and is perforated in sections, is covered beneath the roller 4 with a fiber web 3, by way of example a fleece consisting of natural fibers such as cotton or cellulose, and the web of material which now has two layers passes beneath the pair of perforating rollers 10, 11 which constitute a further deforming means.

The toothed roller 10 is in this case designed in exactly the same way as the toothed roller 8 and is rigidly coupled with the latter so that the paper web covered with a fiber web is perforated only in those transverse zones which have already been perforated in the pair of rollers 8, 9. The toothed roller 10 perforates both the fiber web and the paper web, the perforating teeth being preferably so designed that at least certain fibers of the web are pushed through the holes in the paper web underneath and project through the holes on the underside of the paper web. In this way not only is the fiber web firmly fastened to the paper web on the one hand, but on the other the adsorptive and absorptive capacity of the two-layer material web is increased, particularly in the perforated sections of the web. FIG. 3 shows in diagrammatic reproduction the back of the two-layer web of material after it has left the pair of rollers 10, 11. It can be seen that transverse zones 1c longitudinally corrugated in a uniform manner and perforated transverse zones 1d follow each other in the paper web's direction of travel. The paper web is extensively disintegrated and frayed by the perforating operation and the longitudinal grooving, which was originally present, can hardly be recognized any more. The fibers of the fiber web 3 project through some of the perforation holes in the perforated sections of the web.

It is important that those longitudinal strips of the material web which are perforated in the pair of rollers 10, 11 should, if possible, undergo no further treatment influencing their structure and surface before entering the folding and gathering members, in order that the frayed perforation edges and the fiber tufts should not be pressed against the surface of the web. If, therefore, as in the present case, it is desired that the web of material be further deformed and passed through a pair of rollers 12, 13 before entering the inlet opening 14 of the folding and gathering member 15, said deformation should be restricted to the transverse zones 1c which have not been treated by the last pair of rollers 10, 11. Accordingly, the knurling roller 12, which is rigidly coupled to the pair of rollers 10, 11, has projecting irregularities only in some annual zones and in those transverse zones of its surface which cause a deformation of the sections of the web not perforated in the pair of rollers 10, 11. The irregularities of the knurling roller 12 and suitable elastic sleeves on the counter roller 13 cause the material structure of the web to be compressed in the non-perforated sections 1c, while the previously perforated transverse zones 1d pass through the pair of rollers 12, 13 untouched. In this way the inlet opening 14 of the folding and gathering member 15 receives a web of material consisting of parallel transverse zones of different structure following one another in the direction of travel, wherein a cord section of lower mechanical strength but increased absorptivity and filtering efficiency is always adjacent to a section of higher mechanical strength and lower swelling capacity.

If desired, the web of material, before entering the folding and gathering member 15, can be divided into two or more parallel partial webs. Said division can be accomplished by suitably designed knife rollers. By way of example, the knurling roller 12 in FIG. 2 is equipped with three knife-like cutting rings which cut the two-layer web of material in the middle into four partial webs.

The web of material entering the folding and gathering member 15 must be as stable as possible in its structure. If, by way of example, the paper web 1 has to be made pliable before entering the longitudinal crimping and transverse stretching rollers 6, 7 in order to achieve an adequate degree of deformability for the subsequent deformation, the paper web should be stiffened by suitable aftertreatment at a suitable point of the arrangement in order to ensure that the properties of the filter cord leaving the folding and gathering member 15 do not change even after a prolonged period of time. By way of example, it has proved suitable in the case of some fairly hard kinds of paper to make the paper web pliable by moistening it with water mist or hot aqueous steam before it enters the rollers 6, 7. In this event, the web of material, the structure of which has been altered, is then submitted to a suitable aftertreatment on leaving the pair of rollers 8, 9, for which purpose a smooth electrically heated plate can be used across which the web of material passes. After this or some other appropriate aftertreatment the web of material must in any case be in such a condtion that no changes in its structure are to be feared after a prolonged period of time.

The folding and gathering member 15 consists here of a flat funnel 16 which is continuously reduced in width from the inlet opening 14 and opens into a nozzle-shaped channel 17, the cross-section of which corresponds to the desired size of the endless filter cord to be produced. The dimensions of the inlet opening are adapted to the width and thickness of the web of material in order to ensure that the latter will enter smoothly. The lateral gathering operation effected by means of the funnel interior, which becomes narrower in width and larger in height, can be facilitated in known manner by the incorporation of folding aids, of which an embodiment is shown by way of example in FIG. 4. Here, for instance, the top 21 of the flat funnel 16 is designed as a ribbed plate with longitudinal ribs 22, and the bottom 23 is so shaped that a corrugated funnel channel 24 is produced. The amplitude of these corrugations, i.e. the height of the ribs 22, becomes larger in the direction of travel, while at the same time the distance between adjacent ribs 22 narrows, thus resulting in a constantly increasing corrugation and folding of the web of material passing through.

In order to overcome the friction which the web of material undergoes during folding and gathering in the funnel 16, a feed device for the cord of material is provided in the following channel 17. Said device consists here, by way of example, of two endless conveyor belts 25 and 26, each of which is driven from a driving wheel 27 or 28 respectively, passes over guide pulleys 29, 30 or 31, 32 respectively and forms at opposite points a part of the wall of the outlet channel 17. The travelling speed of the conveyor belts is adjusted to the speed of the web of material entering the flat funnel 16, which speed is determined by the deforming rollers.

On leaving the nozzle-shaped channel 17 of the folding and gathering member 15 the endless filter cord has the desired size. The material is compressed by the gathering operation so that the filter cord tends to expand in a radial direction. To prevent this, the filter cord, on leaving the folding and gathering member 15 passes through an apparatus 33 in which it is provided in known manner with a sheath so that preservation of the cord size desired is ensured.

The resultant filter cord is diagramatically reproduced in cross-section in FIGS. 5, 6 and 7. The sheath 34 contains in FIG. 5 a multi-folded crimped paper web 35, the gathering having been effected without folding aids. FIG. 6 shows a web of material which has also been gathered without folding aids and consists of a carrier web 36 and a fiber covering 37, i.e. a web of material such as is produced in the arrangement according to FIGS. 1 and 2. Finally, FIG. 7 illustrates a filter cord which is produced by the regular folding of four partial webs 38, 39, 40, 41, each of which has two layers.

The deforming means indicated in the embodiment according to FIGS. 1 and 2 represent, of course, only some of the many possible types of such deforming means. By way of example, more than one pair of rollers with interlocking annular stamping edges can be arranged in series in order to achieve an intensive longitudinal crimping. If, in this case, the axial distance between adjacent stamping edges is reduced in each successive pair of rollers, the width of the web of material will also be reduced simultaneously with the step-by-step grooving, which is desirable in the case of some materials that only tolerate slight stretching in a transverse direction. At least one roller of the successive pairs of rollers of the various deforming means, is always driven; if the diametr of the rollers being the same, the following rollers are driven at a higher speed than the preceding ones, the web of material will be additionally stretched in its longitudinal direction. The same effect can be achieved with the pairs of rollers rotating at the same speed if the diameter of the following pairs of rollers is larger.

Apart from the toothed rollers and knurled rollers indicated in FIGS. 1 and 2, it is also possible to use deforming rollers according to FIG. 8 which consist in each case of a roller 42 or 43 acting as a top and bottom stamping die respectively, it being possible, as in the case of the rollers 8 and 10, for successive transvers strips to be provided with irregularities of any desired shape. It is sufficient merely to make sure that there is an adequate number of irregularities within each such transverse zone in the direction of travel. Through-going or axially subdivided transverse zones of such deforming rollers can also, as indicated in FIG. 9, be provided with oblique toothing 44. If it is desired to change the machine over quickly to producing filter plugs of different efficiency, the rollers can be provided with exchangeable surface zones for the irregularities required in each case. The groove shapes of the longitudinally crimping rollers 6, 7 can also, as indicated in FIG. 10, be chosen differently. Finally, it is also possible to roughen certain surface zones of a web of material on one or on both sides by means of suitable brush-type rollers.

As can be seen from the description of the arrangement according to FIGS. 1 and 2, as well as the alternative embodiments of same, it is possible to produce virtually endles filter cords. As the webs of material to be handled are as a rule delivered from a magazine roll (2 in FIGS. 1 and 2), the arrangement has to be stopped and a full magazine roll inserted as soon as the previous one has been used up. Since, however, such an interruption is generally not desirable, means can be provided which make it possible simply to pass from the end of one roll to the beginning of the next.

For this purpose, two magazine rolls for each of the different webs of material are provided on the arrangement concerned: that is to say, there are two magazine rolls 2a, 2b for the paper web 1 in the embodiment according to FIGS. 1 and 2. Once the rolls 2a with the paper web 1a has been used up, the latter's end is joined to the beginning of the paper web 1b of the roll 2b and this magazine roll is unwound, while the empty roll 2a is replaced by a full one and the operation can be repeated, conversely, after the roll 2b has run out. It must, however, be ensured, in order to avoid rejects, that the junction points of the webs 1a/1b after passing through the deforming means and the folding and gathering member 15 yield in the filter cord the same thickness of material as the preceding and following portion of cord. For this purpose, the webs of material 1a/1b are always so joined that at each overlapping point the total quantity of material in the cord is constant and equal to the quantity of material in the non-overlapping parts of the cord. FIGS. 11 and 12 show two embodiments in which the web ends are severed in tapered fashion and overlap each other only to such an extent that the portions missing on the web 1a are exactly equal in area to the additional portions of the web 1b present at the relevant point. It is suitable to secure firmly to the arrangement corresponding cutting tools which are disposed in mirro-picture condition but are similarly shaped, and by means of which first the beginning of the reserve roll and then the end of the empty roll are cut to size, whereup the beginning and end are laid on top of each other, as shown in FIGS. 11 and 12, and passed together to the first deforming means. It is unnecessary in this case to stitch the two webs together as the joint deformation, particularly the perforation, ensures adequate cohesion.

Figure 13:
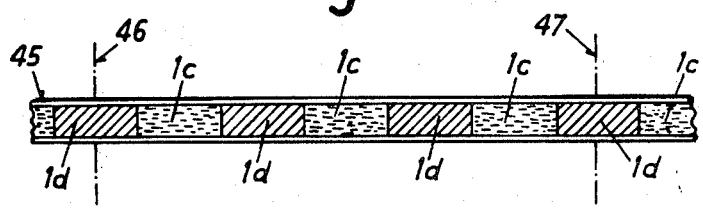
FIGS. 13 to 18 are various longitudinal sections through filter cord portions, designed to explain how the latter are worked into filter plugs.

The construction of the endless filter cord produced in this way can be seen from FIG. 13. Inside the thin paper sheath 45 a cord section 1c is adjacent to a cord section 1d in every case. The desired cord profile can be produced by wrapping the cord in the device 33 (FIGS. 1 and 2), it being possible, if desired, to compress the cord in a radial direction, i.e. to give it an elastic pre-stress. The endless filter cord according to FIG. 13 is then subdivided by means of suitable known cutters, for instance rotating knives, into filter cord portions as shown in FIG. 14 which are suitable for subsequent handling on existing filter plug machines and have a predetermined length between the lines 46 and 47.

If, for instance, two-part filter plugs 11 mm. long are to be produced from filter web sections each 5.5 mm. long and having a greater and lesser absorptive capacity, the filter sections 1c and 1d must each be 11 mm. in length and the distance between the lines 46 and 47 must accordingly be $6 \times 1 = 66$ mm. The endless cord is subdivided in such a way that a half section of cord consisting of perforated material and designated 48d is present at either end, which material should abut the tobacco in the finished filter cigarette. The cord portion in FIG. 14 comprises two other whole cord sections 1d and, in all, three whole cord sections 1c.

Figure 14:
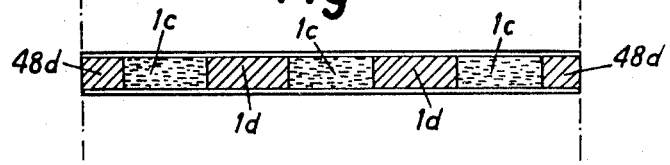
Figure 15:
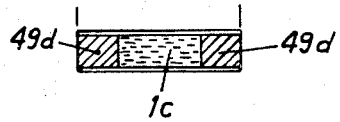

The seven-part cord portion according to FIG. 14 is subdivided into three double plugs in the present embodiment by halving the two whole cord sections 1d. One of said plugs is illustrated in FIG. 15 and consists of a half-cord section marked 49d at either end and a whole-cord section 1c in the middle. Corresponding to the above-mentioned dimensions of the cord portion according to FIG. 14, such a double plug has a length of 22 mm.

Figure 16:
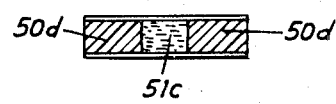

If desired, the cord sections 1c and 1d can, of course, be of different lengths, thus enabling, for instance, double plugs as shown in FIG. 16 to be produced with the two half-length cord sections 50d at both ends and the short-cord section 51c in the middle. These double plugs, however, can if desired, have the same overall length as those in FIG. 15. It is, of course, also possible to use cord sections 1c, 1d which have equal or different lengths and are of other dimensions, and, by way of example, to produce filter cord portions which are similar to those shown in FIG. 14, have a length of 72, 78, 84, 90 mm. and from which double plugs of 24, 26, 28, 30 mm. are made.

Figure 17:
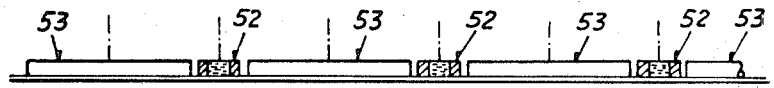
Figure 18:
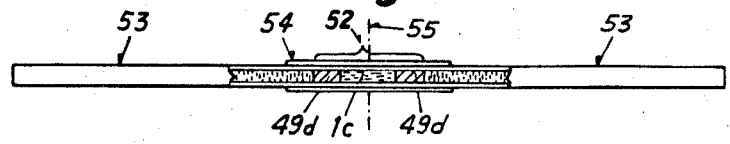

The filter cigarette can now be manufactured from such double plugs as shown in FIG. 15 with the aid of known machines commonly used in the cigarette industry. To this end, a double plug 52 is fed arranged between two tobacco-filled cigarettes 53 and then joined as shown in FIG. 17. In the embodiment illustrated here, this is effected according to FIG. 18 by pressing the two cigarettes 53 against the double plug located between them and then wrapping said plug with a mouthpiece strip 54 which projects beyond the double plug at both ends. Both cigarettes 53 are simultaneously joined to the plugs 52 between them by means of the double-width mouthpiece strip 54 which has been moistened with glue on the inside. If the double plug is now cut along the line 55 and the cord section 1c thus halved, two filter cigarettes will result, each consisting of a tobacco-filled portion 53, a filter section 49d, which abuts the tobacco, a half filter plug section 1c forming the suction end and a mouthpiece strip 54 surrounding the filter plug and the neck of the portion 53.

The present method thus enables an endless filter cord to be produced which, divided into separate sections, can be worked into two-part filter plugs in existing filter plug machines.

FIGS. 1 to 10 show the multi-layer filter plugs can also be produced by this method. If the deforming rollers are suitably designed, filter cords and, from them, double plugs can be produced which, for instance, possess the configuration shown in FIG. 16, but have, in addition, at each end of the cord section 51c a short cord section of different structure and then correspondingly shorter cord sections 50d. Furthermore, it may be pointed out that even before the pair of rollers 6, 7 suitable deforming means can be provided for the purpose of producing successive transverse zones of different structure in the web of material 1. In place of the deforming rollers it is, of course, also possible to use deforming tools of some other type, for instance upwards and downwards oscillating stamping or perforating dies.

The single or multiple web double or multilayer filter cord produced by the method described in the foregoing consists—despite the cord sections of different material structure which follow each other in the longitudinal direction—of the same material along its whole extent and not of different materials arranged one behind the other as is the case with known multilayer filters, as disclosed, for example, in my application Ser. No. 592,394, filed June 19, 1956, now abandoned. This is a great advantage not only with regard to the simplicity of mechanical manufacture, but also on account of the rigid cohesion between the neighboring cord sections. Thus, even if the cutters for subdividing the cord, as illustrated in FIGS. 14 to 18, have to be displaced relatively to the direction of the cord owing to errors in setting them, it need never be feared that the filter plug section forming the section end might fall out while a filter cigarette is being smoked.

Filter cords thus produced enable all requirements to be met by the cord sections 1c forming the section end in respect of attractive appearance, slight discoloration and absence of taste during smoking, specified invariable compression strength, etc., as the longitudinal crimping and the width of the web of material can be chosen accordingly. Without impairing these properties of the suction end in any way, however, the filtering cord section 1d can be fully adapted to varying requirement in respect of nicotine and tar elimination, resistance to flow, swelling capacity, absorptive capacity, etc. by fraying and disintegrating the web material to a greater or lesser extent.

As FIGS. 15 and 16 show, the length of the less absorbent section and of the more absorbent section inside the filter plug may be different. This enables the filter plug to be adapted in a simple manner to the elimination effect desired which may vary according to the brand of cigarette. With the present method of production such an increase or reduction of the efficiency can be easily achieved by setting the sectors, provided with irregularities, of the deforming rollers, for instance the rollers shown in FIGS. 8 and 9, at a greater or lesser angle along the circumference of the roller.

The method described in the foregoing was used, by way of example, to produce a filter cord capable of being worked into two-layer filters and consisting of a smooth paper web which could not be simply folded in a transverse direction. The arrangement employed was that according to FIGS. 1 and 2, but without the second web 3, the roller 4 and the pairs of rollers 10, 11 or 12, 13. The paper web was moistened before entering the pair of rollers 6, 7 and dried by passing over a hot plate after leaving the rollers 8, 9. The rollers 6 and 7 were heatable. A filter cord was produced at a transit speed of more than one meter a second and worked directly into filter plugs in known machines. Such filter plugs, on being opened, reveal a paper web with through-going longitudinally crimped grooves and irregularly distributed crack-like perforations in the longitudinal direction, as well as a transverse zone with a plurality of additional round perforations. By arranging a pair of knurling rollers, for instance of the type shown in FIG. 8, between the longitudinally crimping rollers 6, 7 and the toothed rollers 8, 9, it was possible to produce a filter web in which the through-going crimped grooves were broad-printed in places by a point screen. Both filter cords yielded filter plugs with only slight discoloration of the suction ends, which were pure white in the unsmoked state, but with an outstanding elimination effect in respect of nicotine and tar, viz.:

| Section without round perforation: | Percent |
|---|---|
| Reduction of nicotine | 6 |
| Reduction of tar | 11 |
| Section with round perforation: | |
| Reduction of nicotine | 24 |
| Reduction of tar | 28 |

I claim:

1. The process of manufacturing an elongated strip of cellulosic material particularly adapted for the formation of filters for tobacco smoke, comprising the steps of: moistening paper strip; grooving the moistened paper strip longitudinally while preventing any substantial transverse shrinkage thereof to provide a strip characterized by a plurality of parallel connected loops each having a ridge portion, the adjacent ridges being faced in opposite directions; drying the grooved paper strip to set the loops therein; and compressing the grooved and dried strip.

2. In the manufacture of a filter rod from a web of fibrous material, the procedure which consists in longitudinally advancing the web, lacerating the web during its advancement to form mutilation and fiber displacement without destroying the transverse continuity of the web, and shaping the lacerated web to form a rod-like bundle.

3. In the manufacture of a filter rod from a web of fibrous material, the procedure which consists in longitudinally advancing the web, lacerating the web during its advancement to form mutilation and fiber displacement without destroying the transverse continuity of the web, shaping the lacerated web to form a rod-like bundle, and enclosing the bundle in a tubular wrapper.

4. The method of treating an elongated web of fibrous material to render the same particularly adapted to be gathered laterally, formed into a generally cylindrical rod, and enclosed in a wrapper to make a filter for tobacco smoke, the steps comprising: moistening said web to soften and render the same yielding; passing the moistened web between opposed heated grooving rolls each of rigid material and having a plurality of interfitting circumferential grooves and ridges which engage the web and prevent any substantial transverse shrinkage thereof, thereby forcing said web into said grooves to both form in said web a plurality of closely spaced longitudinal corrugations and laterally stretch the material of the softened web to loosen and expose the fibers thereof; and drying the corrugated stretched web.

5. Apparatus for treating an elongated web of fibrous material to render the same particularly adapted to be gathered laterally, formed into a generally cylindrical rod, and enclosed in a wrapper to make a filter for tobacco smoke, comprising: means for moistening the web to soften and render the same yielding; roller means for simultaneously longitudinally grooving and laterally stretching the material of the moistened web to provide therein a plurality of closely spaced longitudinal corrugations and to loosen and expose the fibers thereof, said rollers means including at least one pair of heated rollers each of rigid material and having a plurality of circumferential grooves separated by ridges of lesser width which project into the grooves on the other roller of said pair; and means for drying the grooved and stretched web to reharden the same and set said corrugations therein.

6. In the manufacture of a filter rod from a web of fibrous material, the procedure which consists in longitudinally advancing the web, lacerating the web during its advancement to form a regular pattern of lacerations, haphazard as respects shape and size, without destroying the transverse continuity of the web, and shaping the lacerated web to form a rod-like bundle.

7. In the manufacture of a filter rod from a web of fibrous material, the procedure which consists in longitudinally advancing the web, lacerating the web during its advancement to form irregular patterns of lacerations, haphazard as respects shape and size without destroying the transverse continuity of the web, and shaping the lacerated web to form a rod-like bundle.

8. A method of producing a filter cord for making plural section filters for cigarettes, comprising:

continuously advancing a virtually endless uniform web of fibrous material;

treating the advancing web in successive transverse zones to alter the structure and the filtering characteristics of the web in different ways in adjacent zones, alternating zones being of the same length longitudinally of the web and the sum of the lengths of adjacent zones corresponding to the length of a plural section filter to be made from the web;

transversely gathering and shaping the web into a generally round string; and enclosing the string in a wrapper to make a filter cord having successive sections of different filtering characteristics with the sum of the lengths of adjacent sections corresponding to the length of a double section filter to be made from the cord, whereby the cord can be subdivided into double filter plugs each having two sections of different filtering characteristics.

9. Apparatus for producing a filter cord for making plural section filters for cigarettes, comprising:

means for continuously advancing a virtually endless uniform web of fibrous material;

means for treating the advancing web in successive transverse zones to alter the structure and the filtering characteristics of the web in different ways in adjacent zones, alternating zones being of the same length longitudinally of the web and the sum of the lengths of adjacent zones corresponding to the length of a plural section filter to be made from the web; and means for enclosing the string in a wrapper to make a filter cord having successive sections of different filtering characteristics with the sum of the lengths of adjacent sections corresponding to the length of a double section filter to be made from the cord, whereby the cord can be subdivided into double filter plugs each having two sections of different filtering characteristics.

References Cited

UNITED STATES PATENTS

| 1,931,979 | 10/1933 | Chandler | 83—660 XR |
| 1,958,694 | 5/1934 | Chandler | 83—660 |
| 2,762,433 | 9/1956 | Russell. | |
| 2,849,932 | 9/1958 | Marogg. | |
| 3,238,852 | 3/1966 | Schur et al. | |

BERNARD STICKNEY, Primary Examiner

U.S. Cl. X.R.

83—2, 660

UNITED STATES PATENT OFFICE
CERTIFICATE OF CORRECTION

Patent No. 3,518,921　　　　　　　　　　　　　　July 7, 1970

Paul A. Müller

It is certified that error appears in the above identified patent and that said Letters Patent are hereby corrected as shown below:

In the heading to the printed specification, lines 8 to 10, "Original application Sept. 1, 1959, Ser. No. 841,918, now Patent No. 635,470, dated Jan. 22, 1957. Divided and this application Feb. 8, 1967, Ser. No. 614,595" should read -- Original application, Sept. 1, 1959, Ser. No. 841,918. Divided and this application Feb. 8, 1967, Ser. No. 614,595. --.

Signed and sealed this 16th day of February 1971.

(SEAL)

Attest:

Edward M. Fletcher, Jr.

Attesting Officer

WILLIAM E. SCHUYLER, JR.

Commissioner of Patents